United States Patent Office 3,332,739
Patented July 25, 1967

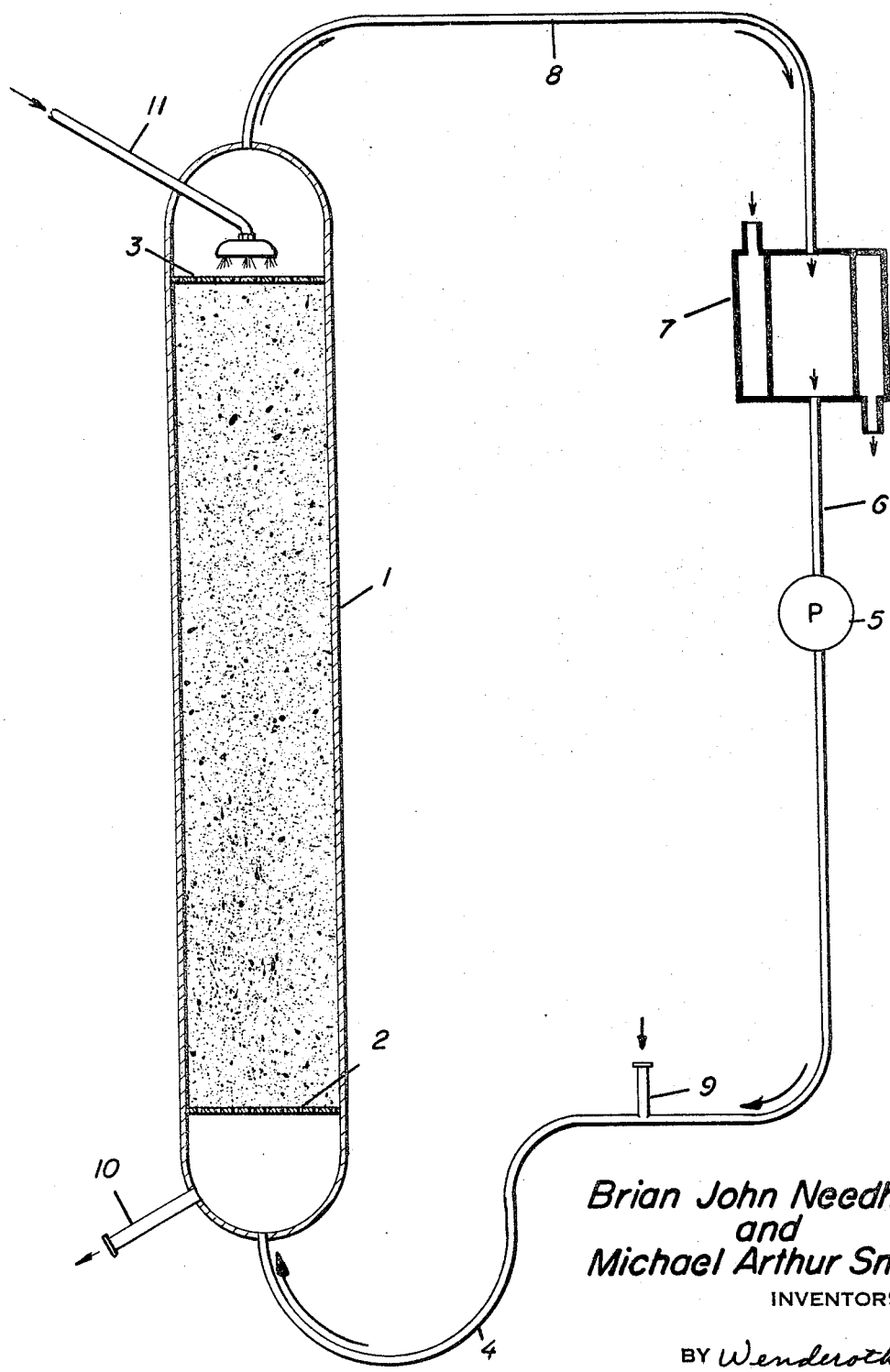

3,332,739
PROCESS FOR PREPARING HYDRAZINE AND SUBSTITUTED HYDRAZINE FROM THEIR CARBONYL DERIVATIVES USING CATION EXCHANGE RESINS
Brian John Needham and Michael Arthur Smith, Loughborough, England, assignors to Whiffen & Sons Limited, Loughborough, Leicestershire, England
Filed June 26, 1964, Ser. No. 378,386
Claims priority, application Great Britain, July 10, 1963, 27,240/63; Aug. 8, 1963, 31,257/63
12 Claims. (Cl. 23—190)

The present invention relates to a process for preparing hydrazine and substituted hydrazines.

Two major processes exist for the preparation of hydrazines. Firstly there is the reaction of a ketone or aldehyde with chlorine or chloramine and excess ammonia, to give the corresponding isohydrazones of the type:

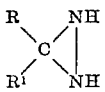

wherein R is hydrogen or alkyl and $R^1$ is an alkyl or aryl group, or R and $R^1$ together form a polymethylene chain, and from which hydrazine salts can be obtained by acid hydrolysis. Secondly there is the well-known Raschig synthesis in which ammonia is reacted with bleach to give hydrazine which can be isolated by distillation. The yields by this latter method are however not particularly high and one way to achieve higher yields and easier isolation of the hydrazine is to add a ketone, for example, acetone or methyl ethyl ketone, to give the corresponding azine which, again, can be readily hydrolysed to hydrazine salts. We have now discovered that hydrazine can be readily obtained in high yields from isohydrazones or azines or other carbonyl derivatives of hydrazine such as hydrazones by the use of cation-exchange materials.

Accordingly the present invention is for a process for preparing hydrazine or a substituted hydrazine which comprises treating an aqueous solution comprising a carbonyl derivative of hydrazine or a substituted hydrazine with a cation-exchange material in the hydrogen form, at a temperature in excess of 40° C., whereby the carbonyl derivative is hydrolysed to the corresponding hydrazine and a carbonyl compound, the hydrazine being retained on the cation exchange material, thereafter treating the cation-exchange material with a base to liberate hydrazine or the substituted hydrazine, and recovering the hydrazine or the substituted hydrazine. The carbonyl derivative of hydrazine or substituted hydrazine may be an isohydrazine, a hydrazone or an azine.

The isohydrazone may be any isohydrazone of the formula:

wherein $R^1$ and $R^2$ are the same or different and are hydrogen, alkyl (for example containing 1–4 carbon atoms such as methyl, ethyl, propyl or butyl), substituted alkyl (such as chlorethyl), aryl (such as phenyl) or substituted aryl, or $R^1$ and $R^2$ together may be a polymethylene chain (for example of 4–8 carbon atoms), and $R^3$ and $R^4$ are the same or different and are hydrogen, alkyl (for example containing 1–4 carbons such as methyl, ethyl, propyl or butyl), substituted alkyl (such as hydroxyethyl or hydroxypropyl, cyanoethyl or acetylethyl) or aryl (such as phenyl). A particularly suitable isohydrazone is methylethyl ketone isohydrazone; other isohydrazones which may be mentioned include acetone isohydrazone, diethyl ketone isohydrazone, cyclohexanone isohydrazone and N-cyclohexyl acetone isohydrazone. Azines which may be used include acetone azine, methylethyl ketone azine, methyl-isobutyl ketone azine, cyclohexanone azine and propionaldazine. Hydrazones which may be used include acetone hydrazone, methylethyl ketone hydrazone and cyclohexanone hydrazone.

In the method for the preparation of hydrazine wherein isohydrazones are first prepared by the reaction of a ketone or an aldehyde with chlorine or chloramine and excess ammonia, in order to obtain hydrazine from the isohydrazone, it had been considered necessary to filter the reaction mixture to remove ammonium chloride, to remove the dissolved ammonia, to distil off the excess aldehyde or ketone, to distil off the isohydrazone from condensation by-products, to hydrolyse the isohydrazone with acid and to distil off the aldehyde or ketone resulting from the hydrolysis. The free base is then obtained from the hydrazine salt by a known method for example by treatment with ammonia under pressure. It has now been found that the number of process steps in the recovery of the hydrazine can be substantially reduced and yields improved by using a cation-exchange material in the hydrogen form to recover the hydrazine direct from the isohydrazone synthesis liquor. According to this embodiment of the present invention therefore the aqueous solution comprising a carbonyl derivative of hydrazine or a substituted hydrazine which is treated with a cation-exchange material is the synthesis material obtained by reacting a ketone or an aldehyde with chlorine or chloramine and excess ammonia or an amine after the removal from the synthesis liquor of ammonia and ammonium chloride. After removing any ketone retained on the resin by washing and treating the resin with a base, an aqueous solution of hydrazine containing the basic by-products of the isohydrazone synthesis is obtained from which the hydrazine is separated by distillation. A small amount of azine is formed as by-product and this can be recycled.

The cation exchange material is preferably one containing strongly acidic groups such as sulphonic, phosphonic or phosphoric groups. The cation-exchange material is suitably one based upon a styrene divinylbenzene copolymer although cation-exchange materials formed from other resinous or polymeric products such as acrylate divinylbenzene copolymers and the like may be used. Preferably the cation-exchange material is a sulphonated polystyrene resin cross-linked with a divinylbenzene copolymer. An inorganic cation-exchange material such as an aluminosilicate or silicic acid may also be used.

The solution of isohydrazone, hydrazone or azine is suitably treated with the cation-exchange material at temperatures in the range of 45° C. to 120° C. The actual temperature will depend on a number of factors but principally, in order to reduce the reaction time, as high as temperature as possible will be used compatible with the stability of the cation exchange material and the tendency of the isohydrazones to undergo decomposition reactions other than hydrolysis. One factor controlling the upper temperature limit will be the boiling point of the mixture of water and the aldehyde or ketone which results from the hydrolysis and if this boiling point is too low it may be necessary to operate the process under pressure. Preferably the solution of the carbonyl derivative of hydrazine is treated with cation-exchange material at a temperature in the range 50° C. to 100° C. Any regenerated ketone retained on the cation-exchange material can be recovered almost quantitatively by eluting the resin with water and distilling the effluent.

The base used to liberate the hydrazine from the cation-exchange material is preferably ammonia, suitably in the form of an aqueous solution containing 4–20% by weight of ammonia. Other bases which may be used include caustic soda, caustic potash and the like.

It has been found that the hydrolysis of the carbonyl derivative of hydrazine is effected with greater efficiency if the cation-exchange material is present in such an amount as to provide at least one acid group per molecule of the carbonyl derivative of hydrazine. Suitably the cation exchange material is present in such quantities that at the most it is only used to 95% of its capacity. Using the cation exchange material in such quantities that it is used to 70–90% of its capacity gives almost quantitive yields.

In order to ensure high yields of hydrazine it is highly desirable that the excess of hydrogen ions are uniformly distributed throughout the whole of the cation-exchange material bed. Uniform distribution may be achieved by mechanical stirring but this may cause rupture of the cation-exchange material beds. Surprisingly it has been found possible to treat the cation-exchange material with the carbonyl derivative of hydrazine while fluidising the resin in an upward flow of water and to obtain optimum yields in this way. Accordingly a preferred embodiment of the present invention is for a process for preparing hydrazine or a substituted hydrazine which comprises establishing a fluidised bed of a cation-exchange material in a circulating stream of water, absorbing on the material an isohydrazone, a hydrazone or an azine, and thereby hydrolysing the isohydrazone, hydrazone or azine, removing the liberated ketone or aldehyde from the cation-exchange material, preferably by washing with water, treating the cation-exchange material with a base, preferably aqueous ammonia, and recovering the hydrazine liberated by the base. Hydrolysis is preferably conducted at an elevated temperature, preferably in the range 45–120° C.

In the process of the present invention the cation-exchange material can be regenerated by treatment with a mineral acid such as sulphuric or hydrochloric acid followed by rinsing with water.

The hydrazine liberated from the cation-exchange material can be recovered by any of the usual processes, for example by distillation. Any ammonia contaminating the hydrazine is removed during rectification.

The accompanying drawing illustrates an apparatus for use in carrying out the fluidisation technique of the present invention.

In this drawing there is illustrated an apparatus which consists of a column 1 provided with meshed filters 2 and 3 made from, for example, nylon or Terylene (a trademark for polyethyleneterephthalate). The lower end of the column is connected via a conduit 4 to a circulating pump 5 which in turn is connected via conduit 6 to a heat exchanger 7. The heat exchanger 7 is connected by conduit 8 to the upper end of column 1. Conduit 4 is provided with an inlet line 9 and column 1 is provided with a drainage line 10 and a spray inlet 11.

In operation granular cationic-exchange material is contained in column 1 between filters 2 and 3. This material is maintained in a fluidised state by pumping water from the top of the column through heat exchanger 7 and pump 5 to the bottom of the column. Synthesis material containing isohydrazone is added to the circulating water through inlet line 9. In this way the isohydrazone is contacted with the cation-exchange material and decomposed into hydrazine and aldehyde or ketone, the hydrazine being absorbed on the cation-exchange material. In order to speed up this process the temperature of the synthesis material during circulation is raised by heat exchanger 7. On completion of the reaction the circulation of the synthesis material is stopped and liquid in column 1 is drained through line 10. The cation-exchange material is washed with water to remove the residual ketone or aldehyde, leaving the resin containing absorbed hydrazine as a residue on mesh filter 2.

Aqueous ammonia is now sprayed through spray inlet 11 on to the bed of cation-exchange material where the ammonia replaces the hydrazine as the bound component of the cation-exchange material. The displaced hydrazine is collected as a solution in aqueous ammonia from drainage line 10. The hydrazine is recovered from the solution of aqueous ammonia by distillation. The solution of aldehyde or ketone resulting from the treatment of the cation-exchange material with isohydrazone is distilled to recover the aldehyde or ketone which can then be used to form more isohydrazone.

The following examples in which parts and percentages are by weight are given to illustrate the process of the present invention.

*Example 1*

1.8 parts of methylethyl ketone isohydrazone were diluted with 50 parts of water and the mixture was heated to the boil with 15 parts of a sulphonated polystyrene resin cross-linked with divinyl benzene commercially available as Zeo-Karb 225 containing 2.2 milli-equivalents per gram. After cooling to ambient temperature the resin was filtered off, washed with water and stirred twice with 35 parts of an 8% aqueous solution of ammonia. After this treatment with ammonia the resin was filtered off leaving a filtrate containing 95% of the theoretical yield of hydrazine hydrate.

*Example 2*

1.8 parts of methylethyl ketone isohydrazone were diluted with 50 parts of water and stirred with 11 parts of a suphonated polystyrene resin cross-linked with divinyl benzene and commercially available as Zeo-Karb 225 for one hour at 50° C. The resin was then removed by filtration. The regenerated methylethyl ketone was recovered by distillation of the filtrate in 95% yield. The resin was stirred twice with 20 parts of an 8% aqueous solution of ammonia; 95% of theoretical yield of hydrazine hydrate was liberated.

*Example 3*

Acetone ketazine tetrahydrate (2 parts) diluted with 20 parts of water was stirred for one hour with a sulphonated polystyrene resin cross-linked with divinyl benzene and commercially available as Zeo-Karb 225 (10 parts) in the hydrogen form at 60° C. The resin was separated, stirred with 4.0% aqueous ammonia (26 parts) and filtered. The filtrate contained 98% of the original hydrazine as a 1.4% solution.

*Example 4*

80 parts of a sulphonated polystyrene resin commercially available as Amberlite IR120, contained in a column having a height to diameter ratio of 8:1 were maintained in a fluid state by passing water up the column at the rate of 600 parts per minute, the residence time in the column being 36 seconds. The total volume of the system was 800 parts. The isohydrazone of methylethyl ketone (9.67 parts) was injected into the system and was quickly absorbed by the resin. The water was heated to 50% C. and circulated through the apparatus for 1 hour to complete the hydrolysis of the isohydrazone to hydrazine. The system was then drained and was washed free of methylethyl ketone with water. The methylethyl ketone was recovered from the combined aqueous solutions by distillation. The resin was washed with 150 parts of ammonia (16%) to recover hydrazine hydrate in 95% yield as a 22% solution.

*Example 5*

Ammonia (108 parts/hr.), chlorine (5.60 parts/hr.) and nitrogen (25 parts/hr.) were premixed and bubbled into methylethyl ketone (100 parts) at −5° C. to 0° C. for 25 minutes. The reaction mixture was allowed to attain ambient temperature, the solid ammonium chloride was removed by filtration and the dissolved ammonia removed by vacuum. The resultant solution, which contained eight parts of the isohydrazone of methylethyl ketone, was stirred with a sulphonated polystyrene resin cross-linked with divinyl benzene and commercially available as Zeo-Karb 225 (61 parts, 2.2 meq./g.) and water (300 parts) and heated for one hour at 50° C. The resin was separated by filtration and washed free of ketone with water. The methylethyl ketone was recovered from the filtrate and washings by distillation. The resin was washed twice with 5% aqueous ammonia (70 parts) to recover the hydrazine in 97% yield.

*Example 6*

A sulphonated polystyrene resin cross-linked with divinyl benzene and commercially available as Zeo-Karb 225 (2,145 parts 2.0 meq./g.) contained in a glass column 1, which is two feet long and 4 inches internal diameter, was maintained in a fluidised state by circulating water (6000 parts) up the column at 1500 parts/minute. Methylethyl ketone isohydrazone synthesis liquor containing 258 parts of isohydrazone was obtained by passing premixed ammonia (640 parts/hr.), chlorine (36 parts/hr.) and nitrogen (100 parts/hr.) into methylethyl ketone (3000 parts) at −5° C. to 0° C. for two hours, followed by removal of solid ammonium chloride and dissolved ammonia. The synthesis liquor was added to the water circulating through the column and resin was maintained at 50° C. for one hour. The system was drained and the resin washed with water until free of ketone. Methylethyl ketone was recovered in 98% yield. Hydrazine hydrate and the basic by-products were recovered from the resin by elution with 4000 parts of a 16% aqueous ammonia solution using spray device 11. Hydrazine hydrate was recovered in 98% yield as a 21% solution by collecting the middle fraction of the effluent. Pure hydrazine hydrate was recovered by rectification.

*Example 7*

80 parts of a sulphonated polystyrene resin cross-linked with divinyl benzene and commercially available as Zeo-Karb 225 resin (2.2 meq./g.) contained in a column having a height to diameter ratio of 8:1 were maintained in a fluid state by passing water up the column at a rate of 600 parts per minute. Methylethyl ketazine (24 parts) was injected into the system and the water heated to 70° C. for 15 minutes to complete the hydrolysis. The system was drained and washed free of ketone with water. Hydrazine hydrate was recovered from the resin in 95% yield as a 22% solution by elution with 150 parts of 16% ammonia.

*Example 8*

80 parts of sulphonated polystyrene resin cross-linked with divinyl benzene and commercially available as Zeo-Karb 225 resin (2.2 meq./g.) contained in a column having a height to diameter ratio of 8:1 were maintained in a fluid state by passing water up the column at a rate of 600 parts per minute. Benzaldehyde hydrazone (15 parts) was injected into the system and the water heated to 95° C. for 30 minutes. The system was drained and the resin washed free of benzaldehyde. Hydrazine hydrate was recovered in 80% yield by elution with 150 parts of 16% ammonia solution.

*Example 9*

80 parts of sulphonated polystyrene resin cross-linked with divinyl benzene and commercially available as Zeo-Karb 225 resin contained in a column having a height to diameter ratio of 8:1 were maintained in a fluid state by passing water up the column at a rate of 600 parts per minute. The water was heated to 70° C. and 20 parts of the isohydrazone of formula:

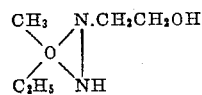

was injected into the system. The circulating water was maintained at 70° C. for 30 minutes and then drained from the apparatus. The resin was washed free of methylethyl ketone with water and then washed with 150 parts of 16% ammonia solution to recover the beta-hydroxyethyl hydrazine. The substituted hydrazine was recovered in 97% yield as a 7% solution.

*Example 10*

80 parts of a sulphonated polystyrene resin cross linked with divinyl benzene and commercially available as Zeo-Karb 225 resin contained in a column having a height to diameter ratio of 8:1 were maintained in a fluid state by passing water up the column at a rate of 600 parts per minute. The water was heated to 50° C. and 17.5 parts of N isopropyl, acetone isohydrazone was added to the system. The water was circulated at 50° C. for 90 minutes, drained from the system and the resin washed with water until free of acetone. Isopropylhydrazine was recovered from the resin in 78% yield by passing 150 parts of 16% ammonia solution down the column.

*Example 11*

80 parts of a sulphonated polystyrene resin cross linked with divinyl benzene and commercially available as Zeo-Karb 225 resin (2.2 meq./g.) contained in a column having a height to diameter ratio of 8:1 were maintained in a fluid state by passing water up the column at a rate of 600 parts per minute. N-butyl, heptaldehyde isohydrazone (28 parts) was injected into the system and the water heated to 95° C. for 30 minutes. The system was drained and washed free of heptaldehyde. Butylhydrazine was recovered from the resin in 72% yield by treatment with 150 parts of 16% ammonia solution.

*Example 12*

80 parts of a sulphonated polystyrene resin cross linked with divinyl benzene and commercially available as Zeo-Karb 225 resin (2.2 meq./g.) contained in a column having a height to diameter ratio of 8:1 were maintained in a fluid state by passing water up the column at a rate of 600 parts per minute. $NN^1$ diethyl methyl ethyl ketone isohydrazone (21 parts) was injected into the system and the water heated to 70° C. for 15 minutes. The system was drained and washed free of ketone. The resin was eluted with 150 warts of 16% ammonia solution and the sym-diethylhydrazine recovered in 68% yield.

*Example 13*

23 parts of acetone phenylhydrazone were stirred with water (150 parts) and a sulphonated polystyrene resin, Dowex-50, (80 parts:2.3 meq./g.) and the mixture heated at the boil for 15 minutes. After cooling, the resin was recovered by filtration and washed with water until free of acetone. The resin was then stirred twice with 150 parts of a 16% aqueous ammonia solution and filtered, giving phenylhydrazine in 90% yield.

*Example 14*

0.9 part of methyl ethyl ketone isohydrazone dissolved in 50 parts of water was stirred with 15 parts of a phenolic resin containing —$CH_2SO_3H$ groups, Duolite C3 (1.2 meq./g.) at 50° for one hour. After cooling, the resin was filtered off, washed free from ketone and twice extracted with 35 parts of an 8% aqueous solution of ammonia. The resin was filtered off leaving a filtrate containing 96% of the theoretical amount of hydrazine.

*Example 15*

1.8 parts of methyl ethyl ketone isohydrazone in 50 parts of water was stirred with 11 parts of a polystyrene resin containing phosphonic acid groups, Duolite C63 (3.0 meq./g.) at 70° for 15 minutes. Filtration of the resin and treatment as in Example 14 gave an 80% yield of hydrazine.

We claim:

1. A process for the preparation of a hydrazine compound selected from the group consisting of hydrazine and a substituted hydrazine which comprises treating an aqueous solution comprising a carbonyl derivative of the hydrazine compound selected from the group consisting of isohydrazones, hydrazones and azines, with a cation-exchange resin whereby the carbonyl derivative is hydrolysed to the corresponding hydrazine compound which is retained on the resin, thereafter treating the cation-exchange resin with a base to liberate the hydrazine compound from the resin and recovering the hydrazine compound.

2. A process for the preparation of a hydrazine compound selected from the group consisting of hydrazine and a substituted hydrazine which comprises treating an aqueous solution comprising a carbonyl derivative of the hydrazine compound selected from the group consisting of isohydrazones, hydrazones, and azines with a cation-exchange resin at a temperature in the range 40° C. to 120° C. whereby the carbonyl derivative is hydrolysed to the corresponding hydrazine compound which is retained on the resin, the proportion of the carbonyl derivative to the cation-exchange resin being such that the cation-exchange resin is used to 70% to 90% of its capacity, thereafter treating the cation-exchange resin with an aqueous solution of ammonia to liberate the hydrazine compound from the resin and recovering the hydrazine compound.

3. A process for the preparation of a hydrazine compound selected from the group consisting of hydrazine and a substituted hydrazine which comprises establishing a fluidised bed of a cation-exchange resin in a circulating stream of water, absorbing on the resin a carbonyl derivative of the hydrazine compound selected from the group consisting of isohydrazones, hydrazones and azines and thereby hydrolysing the carbonyl derivative to the corresponding hydrazine compound which is retained on the resin, the proportion of the carbonyl derivative to the cation-exchange resin being such that the cation-exchange resin is used to 70% to 90% of its capacity, thereafter treating the cation-exchange resin with an aqueous solution of ammonia containing 4% to 20% by weight of ammonia, so liberating the hydrazine compound from the resin and recovering the hydrazine compound.

4. A process for the preparation of a hydrazine compound selected from the group consisting of hydrazine and a substituted hydrazine which comprises treating an aqueous solution of an isohydrazone with a cation-exchange resin at a temperature in the range 45° C. to 120° C. whereby the isohydrazone is hydrolysed to the corresponding hydrazine compound which is retained on the resin, thereafter treating the cation-exchange resin with an aqueous solution of ammonia to liberate the hydrazine compound and recovering the hydrazine compound, the isohydrazone having the formula:

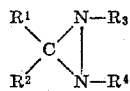

wherein $R^1$ to $R^4$ are selected from the group consisting of hydrogen, alkyl, substituted alkyl, aryl and substituted aryl.

5. A process for the preparation of a hydrazine compound selected from the group consisting of hydrazine and a substituted hydrazine which comprises treating an aqueous solution of an isohydrazone with a cation-exchange resin at a temperature in the range 50° C. to 100° C. whereby the carbonyl derivative is hydrolysed to the corresponding hydrazine compound which is retained on the resin, the proportion of the isohydrazone to the cation-exchange resin being such that the cation-exchange resin is used to 70% to 90% of its capacity, thereafter treating the cation-exchange resin with an aqueous solution of ammonia containing 4% to 20% by weight of ammonia, so liberating the hydrazine compound from the resin and recovering the hydrazine compound, the isohydrazine having the formula:

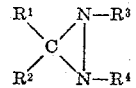

wherein $R^1$ and $R^2$ are selected from the group consisting of hydrogen, methyl, ethyl, propyl, butyl and phenyl and $R^3$ and $R^4$ are selected from the group consisting of hydrogen, methyl, ethyl, propyl, butyl, hydroxyethyl, hydroxypropyl, phenyl and hydroxphenyl.

6. A process for the preparation of a hydrazine compound selected from the group consisting of hydrazine and a substituted hydrazine which comprises establishing a fluidised bed of a cation-exchange resin in a circulating stream of water, absorbing on the resin an isohydrazone and thereby hydrolysing the isohydrazone to the corresponding hydrazine compound which is retained on the resin, the proportion of isohydrazone to the cation-exchange resin being such that the cation-exchange resin is used to 70% to 90% of its capacity, thereafter treating the cation-exchange resin with an aqueous solution of ammonia containing 4% to 20% by weight of ammonia so liberating the hydrazine compound from the resin and recovering the hydrazine compound, the isohydrazone having the formula:

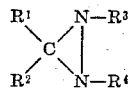

wherein $R^1$ and $R^2$ are selected from the group consisting of hydrogen, methyl, ethyl, propyl, butyl and phenyl and $R^3$ and $R^4$ are selected from the group consisting of hydrogen, methyl, ethyl, propyl, butyl, hydroxyethyl, hydroxypropyl, phenyl and hydroxphenyl.

7. A process for the preparation of a hydrazine compound selected from the group consisting of hydrazine and a substituted hydrazine which comprises reacting together a carbonyl compound selected from the group consisting of a ketone and an aldehyde, with chlorine compound selected from the group consisting of chlorine and chloramine, and excess ammonia and thereafter removing ammonia and ammonium chloride to give a synthesis material containing an isohydrazone, treating the synthesis material with a cation-exchange resin at a temperature in the range 50° C. to 100° C. whereby the isohydrazone in the synthesis material is hydrolysed to the corresponding hydrazine compound which is retained on the resin, the proportion of the isohydrazone to the cation-exchange resin being such that the cation-exchange resin is used to 70% to 90% of its capacity, thereafter treating the cation-exchange resin with an aqueous solution of ammonia containing 4% to 20% by weight of ammonia and so liberating the hydrazine compound from the resin.

8. A process for the preparation of a hydrazine compound selected from the group consisting of hydrazine and a substituted hydrazine which comprises reacting together a carbonyl compound selected from the group consisting of a ketone and an aldehyde with a chlorine compound selected from the group consisting of chlorine and chloramine, and excess ammonia and thereafter removing ammonia and ammonium chloride to give a synthesis material containing an isohydrazone, absorbing the synthesis material on a cation-exchange resin maintained as a fluidised bed in a circulating stream of water thereby hydrolysing the isohydrazone to the corresponding hydrazine compound which is retained on the resin, the porportion of isohydrazone to the cation-exchange resin being such that the cation-exchange resin is used to 70% to 90% of its capacity, thereafter treating the cation-exchange resin with an aqueous solution of ammonia containing 4% to 20% by weight of ammonia so liberating the hydrazine compound from the resin and recovering the hydrazine compound.

9. A process according to claim 5, wherein the isohydrazone is methyl ethyl ketone isohydrazone.

10. A process according to claim 5, wherein the carbonyl derivative is a hydrazone selected from the group consisting of acetone hydrazone, methyl ethyl ketone hydrazone, cyclohexanone hydrazone, benzaldehyde hydrazone and acetone phenyl hydrazone.

11. A process according to claim 5, wherein the carbonyl derivative is an azine selected from the group consisting of acetone azine, methyl ethyl ketone azine, methyl isobutyl ketone azine, cyclohexanone azine and propionaldazine.

12. A process according to claim 5, wherein the carbonyl derivative is an isohydrazone selected from the group consisting of methyl ethyl ketone isohydrazone, acetone isohydrazone, diethyl ketone isohydrazone, cyclohexanone isohydrazone, N-cyclohexyl acetone isohydrazone, N-isopropyl acetone isohydrazone, N-butyl heptaldehyde isohydrazone, N,N'-diethyl methyl ethyl ketone isohydrazone and the isohydrazone of the formula

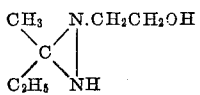

References Cited
UNITED STATES PATENTS

| | | | |
|---|---|---|---|
| 2,999,861 | 9/1961 | Fleck et al. | 260—583 |
| 3,134,814 | 5/1964 | Sargent et al. | 260—583 |
| 3,159,632 | 12/1964 | Sargent | 260—583 |

OSCAR R. VERTIZ, *Primary Examiner.*

H. S. MILLER, *Assistant Examiner.*